I. G. MACFARLANE.
Seed-Planter.
No. 10,655.
Patented Mar. 14. 1854.
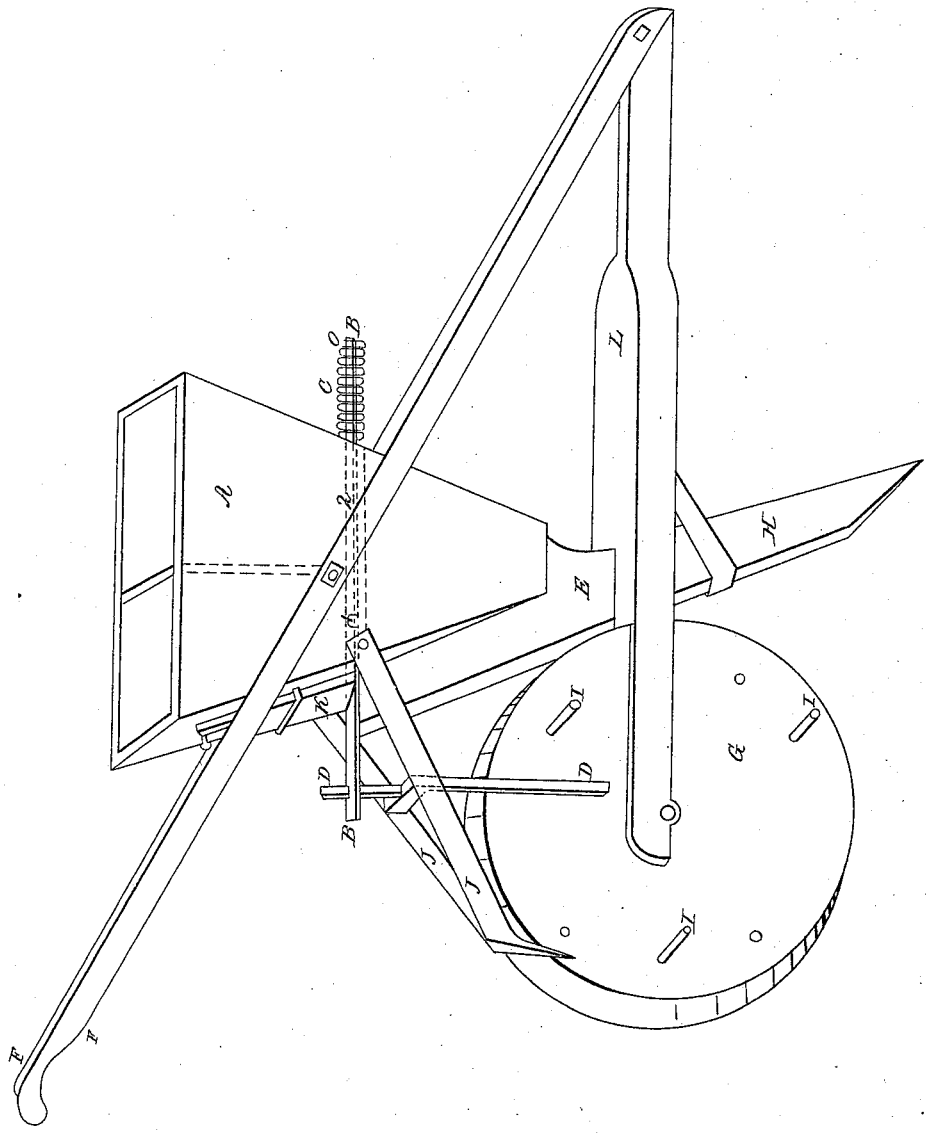

UNITED STATES PATENT OFFICE.

J. G. MACFARLANE, OF PERRY COUNTY, PENNSYLVANIA.

IMPROVEMENT IN SEED-PLANTERS.

Specification forming part of Letters Patent No. 10,655, dated March 14, 1854.

*To all whom it may concern:*

Be it known that I, J. G. MACFARLANE, of the county of Perry and State of Pennsylvania, have invented a new and useful Improvement in Corn-Planters; and I do hereby declare that the following is a full, clear, and exact description of the construction and operation of the same, reference being had to the annexed drawings, forming part of this specification, in which—

Figure 1 is a perspective view of the planter. Fig. 2 is a vertical longitudinal section of the same.

Similar letters indicate the same part.

My invention consists in the employment of a self-acting slide or scraper working over the feeding-apertures for preventing more than the proper number of grains from falling to the furrow at each hill; also, in the use of a hanging scraper, by which the groove of the wheel is always kept clean, so as to be in condition for facilitating the operation of the wheel, as will hereinafter be described.

The following are the references shown in the drawings.

A is the hopper, with a division, one for corn and the other lime, guano, &c.

B is the slider, operated on by spiral spring C and lever or crank D, having a small round aperture, 1, which receives and discharges the grains of corn from the hopper, and at the other end a long aperture, 2, or slot, through which the lime likewise passes, and is discharged through the funnel E underneath at the same time.

F are the handles.

G is the operating-wheel, located immediately behind the tooth or drill H. This wheel has a grooved periphery and flanges at each side, so that the corn falling through the drill H is immediately covered by the earth being pressed over the grain from each side by the flanges of the wheel. The wheel G has projecting pins I, which operate upon the crank D, and thus a regular motion is given to the seeding operation, and by diminishing or increasing the number of pins the space between the hills is regulated. The drill H is sharp-edged, front dividing the furrow for the depositing the grain in the very lowest part of furrow, and thus is perfectly covered by the flanges of the wheel G.

J is the scraper or cleaner, acting by its own weight, resting on the center groove of the wheel, for the purpose of keeping the wheel free from dirt.

K is the self-acting wooden scraper, resting by its own weight on the slider B, and operating on it in a clip attached to the back of hopper, for the purpose of preventing more than the proper number of grains from passing over the aperture at one time.

L is the frame.

What I claim as my invention, and desire to secure by Letters Patent, is—

The combination of the action of the lever B D, cams I, spring C, and the weight of the scraper J to clean the wheel G.

In testimony whereof I have hereunto signed my name before two subscribing witnesses.

J. G. MACFARLANE.

Witnesses:
 GEO. PATTEN,
 SAML. GRUBB.